E. GROSSENBACHER.
AUTOMATIC REGULATOR.
APPLICATION FILED MAY 14, 1920.
1,435,921.
Patented Nov. 21, 1922.
2 SHEETS—SHEET 2.
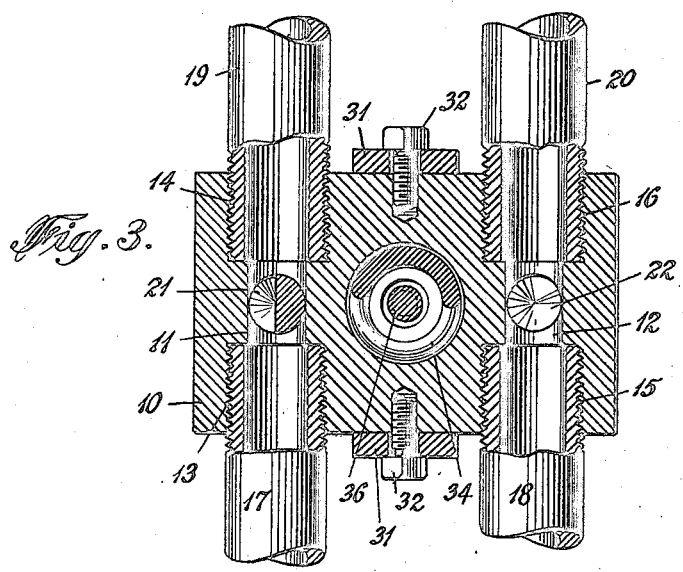
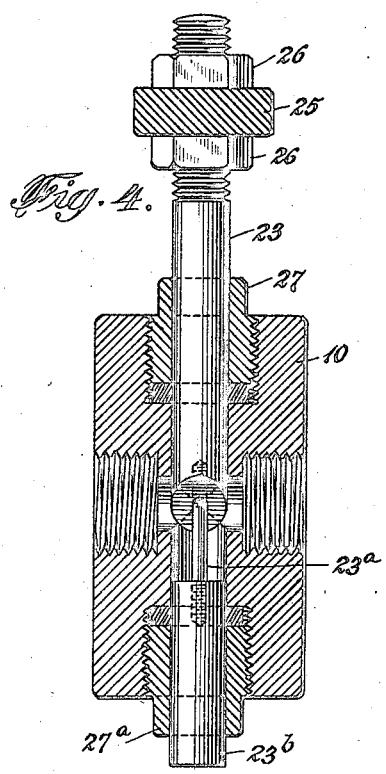
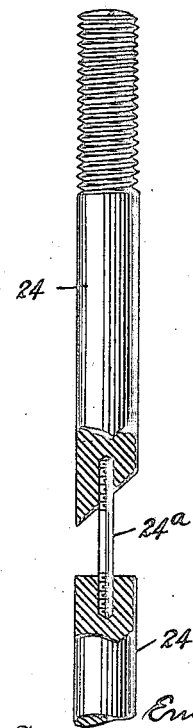
Inventor
Ernest Grossenbacher
By his Attorneys Patented Nov. 21, 1922.

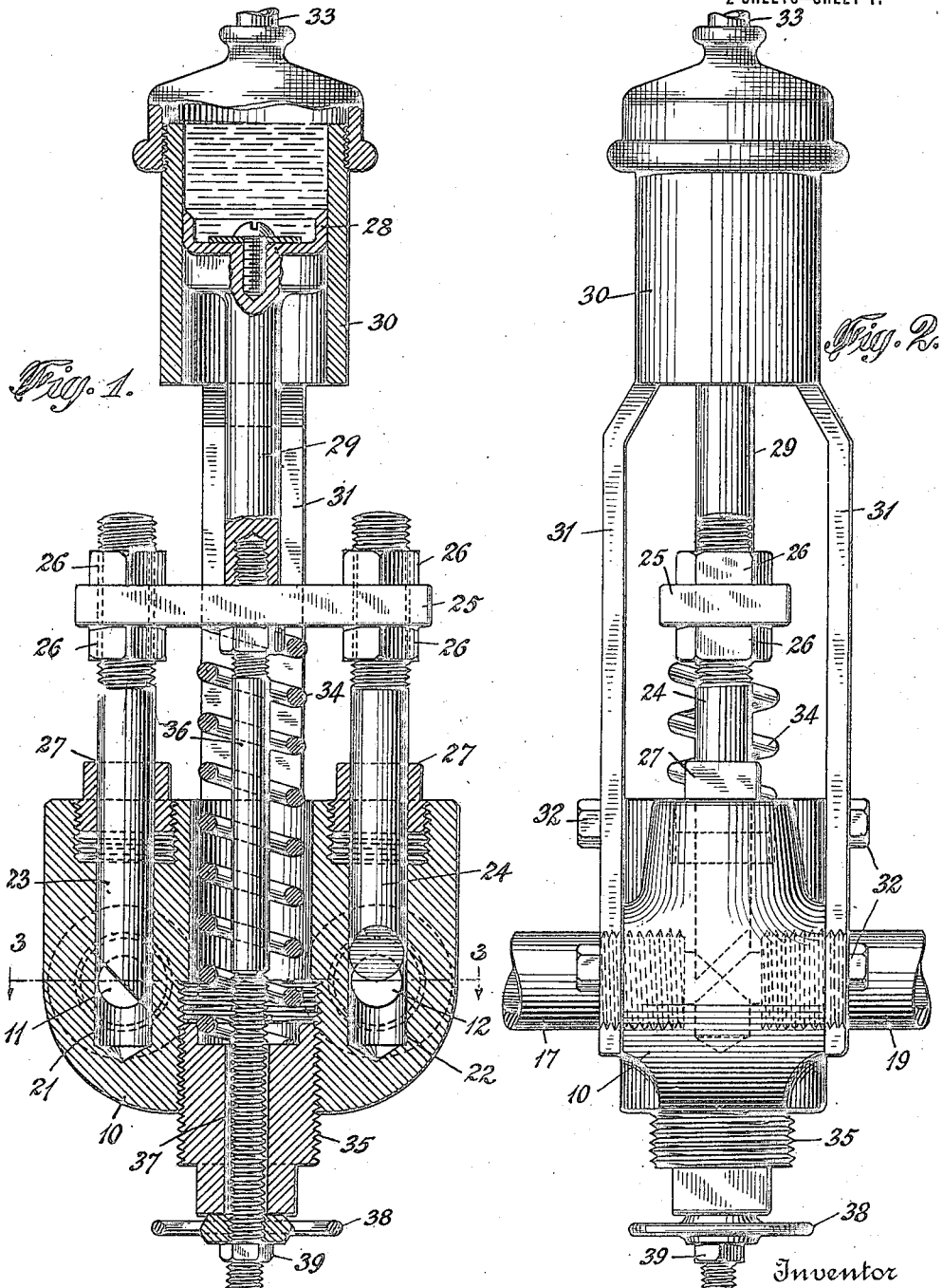

1,435,921

UNITED STATES PATENT OFFICE.

ERNEST GROSSENBACHER, OF FAJARDO, PORTO RICO.

AUTOMATIC REGULATOR.

Application filed May 14, 1920. Serial No. 381,504.

*To all whom it may concern:*

Be it known that I, ERNEST GROSSENBACHER, a citizen of the United States, and resident of Fajardo, Porto Rico, have invented certain new and useful Improvements in Automatic Regulators, of which the following is a specification.

My invention relates to regulators and has for its object to provide a simple and efficient apparatus whereby the admixture of certain predetermined media may be automatically controlled and whereby the proportions of the admixture may be automatically maintained at a relatively constant point. A further object of my invention is to construct the regulator in such a manner that it may be readily adjusted to automatically provide any variety of admixtures which may be desired. The invention will be fully described hereinafter and the features of novelty will be pointed out in the appended claims.

It will be understood that the regulator may be used for controlling the admixture of a plurality of gaseous media, a plurality of liquid media, gaseous and liquid media, liquefied solids with any other medium, gasified liquids with any other medium, liquefied gases with any other medium and in short may be utilized in connection with the admixture of any number of media in the predetermined proportion regardless of the quantity or volume. Thus in practice the apparatus is, for instance, adaptable to the admixture of paints or chemicals or for maintaining the correct mixture of the welding gas in oxy-acetylene welding apparatus or it may be utilized in connection with oil burning furnaces. For the purposes of illustration and description and without intending to define the limits of the invention, the latter is shown, in the accompanying drawings, as used in connection with an oil burner; in said drawings Fig. 1 is a sectional elevation; Fig. 2 is a side elevation; Fig. 3 is a horizontal section on the line 3—3 of Fig. 1 and Figs. 4 and 5 are detail views showing another form of my invention.

In the form illustrated in the drawings the regulator comprises a body 10 which is provided with transverse passages 11 and 12 communicating at opposite ends respectively with internally screw-threaded recesses 13 and 14 and 15 and 16. The recesses 13 and 15 constitute inlets and are adapted to accommodate pipes 17 and 18 whereby said passages 11 and 12 are connected respectively with a source of liquid fuel, such as oil, and with a source of atomizing medium such as steam, air or gas under pressure. The recesses 14 and 16 on the other hand constitute outlets and are intended to receive the ends of pipes 19 and 20 respectively whereby the passages 11 and 12 are connected with the atomizing device which in the illustrated example may be an oil burner of any conventional type and which has not been illustrated as it forms no part of the present invention. The passages 11 and 12 are intersected by valve channels 21 and 22 respectively in which the valves 23 and 24, whereby communication between the inlet pipes 17 and 18 and the respective outlet pipes 19 and 20 is controlled, are movable and adjustable.

It will be understood that the passages 11 and 12 and the valves 23 and 24 are specially cut or in other words are designed and dimensioned in a predetermined manner with respect to each other and in accordance with the particular purpose for which the regulator, in each case, is intended. Thus in the illustrated example, the passages 11 and 12 are cylindrical and of predetermined area while the valves 23 and 24 are in the form of cylindrical plungers having diameters corresponding to those of the passages 11 and 12 and having their free ends cut at angles of approximately 45° as shown in Fig. 1. As shown in the drawings the valves 23 and 24 are carried by a yoke 25 so as to be adjustable relatively thereto in the direction of their length and also about their axes, suitable lock nuts 26 being provided for securing said valves in their adjusted positions; stuffing boxes 27 of appropriate construction may be provided for sealing the joints between said valves and the valve body.

Any suitable means may be provided for concurrently operating said valves 23 and 24, the illustrated example including two means, one intended for manual operation and the other for automatic operation. The automatic means may comprise a piston, a diaphragm or any other mechanical or electrical device and in the present instance is shown in the form of a piston 28 connected by means of a rod 29 with the yoke 25 and slidable in a cylinder 30. The latter may be mounted upon members 31 suitably secured to the valve body 10 as by nuts 32 and is connected by means of a pipe 33 with the boiler in which steam is being generated, the connection being such that the piston is influenced by the steam pressure in said boiler. A spring 34 is located between the yoke 25 and a plug 35 which is screwed into the body 10 and serves to counteract or resist the action of the piston 28 or equivalent device, the tension of said spring 34 being changed by adjusting the plug 35 in the body 10. In its illustrated form the regulator includes also a means whereby the movement of the valves 23 and 24 in the direction of opening is arrested or in other words whereby the fully open position of said valves is positively determined. As shown, this means which, in addition to its other functions, constitutes the manually operated means previously mentioned, comprises a limit rod 36 which is attached to the yoke 25 and which extends through and beyond an axial opening 37 in the plug 35, it being understood that the dimensions of said opening 37 are such as to permit a sliding movement of the rod 36 relatively to said plug 35. The rod 36 is screwthreaded for the reception of a hand wheel 38 and a limit nut 39, the former being arranged for contact with the plug 35 and the nut 39 being set to a predetermined position to prevent over-working of the apparatus; that is to say, to prevent more than a predetermined maximum of oil and steam from passing through the regulator for a boiler of given capacity.

When constructed in the form so far described the regulator is adjusted and operates as follows:

The connections between the body 10 and the fuel pipe 17 and steam pipe 18 and between the outlets 14 and 16 and the burner having been made, the cylinder 30, above the piston 28 is filled with water and connected by means of the pipe 33 with the boiler. Either at this stage or previously the valves 23 and 24 are adjusted relatively to each other in accordance with the mixture desired, it being understood that the adjustment may require a lengthwise movement of one or both valves or a rotative movement about their axes or both a lengthwise and rotative adjustment of one or both valves to secure the desired result.

Steam is now opened up under full pressure and also opened up to the burner, the valves 23 and 24 at this stage however, being in their closed position. When this has been done the spring plug 35 is slowly taken up or adjusted until steam is seen to escape from the burner, the adjustment of said plug serving to open up the valves 23 and 24. The oil connection between the regulator and the burner which up to this point has remained closed, is now opened and the burner is ignited in the customary manner. As soon as the boiler pressure appears to drop, the spring plug 35 is adjusted inwardly still further to open up the valves 23 and 24 to a greater extent, which adjustment is continued until the boiler pressure remains constant. When this condition has been reached the hand wheel 38 is adjusted on the limit rod 36 until there is a clearance of about one-sixteenth of an inch between it and the plug 35 after which the limit nut 39 is loosely set against said hand wheel. The regulator is now properly adjusted and the valves 23 and 24 will be automatically actuated in one direction, by the steam pressure upon the piston 28, whereby said valves are closed more or less to cut down the fuel supply to the burner and to coincidentally regulate the steam in accordance to provide the proper mixture and to reduce the flame. When the steam pressure upon the piston 28 falls the valves 23 and 24 are opened up by the action of the spring 34 to increase the supply of fuel to the burner and to concurrently regulate the steam accordingly to provide the proper mixture for an increased flame. Thus, whatever adjustment of the valves 23 and 24 may follow from an actuation of the piston 28 or because of the action of the spring 34, the correct proportions of oil and steam required in each instance to secure maximum efficiency are automatically maintained while at the same time the boiler pressure is maintained at a substantially constant point without the services of an attendant.

When it is desired to shut down the boiler, the hand wheel 38 is screwed up on the limit rod 36 and by bearing against the plug 35 closes the valves 23 and 24 and thus extinguishes the burner; when starting up, the hand wheel 38 is operated in the reverse direction, after the main steam and oil valves have been opened up respectively. The hand wheel 38 in co-operation with the plug 35 also serves to limit the extent of opening of the valves 23 and 24 under the action of the spring 34 when pressure on the piston 28 is reduced; by adjusting the position of said hand wheel on the limit rod 36 the extent of opening of said valves 23 and 24 may be varied.

By rotating said valves 23 and 24 about their axes and setting them, the supply of media passing beyond said valves may be regulated so as to provide any desired relative proportions in the mixture, and the proper mixture, once obtained, will be maintained regardless of the positions which said valves may assume. In the case of oil burners this means that perfect combustion is obtained and no surplus steam, air, oil or gas will be blown into the furnace.

In the form shown in Figs. 4 and 5 the valves 23 and 24 are connected, by means of stems 23ª and 24ª with plungers 23ᵇ and 24ᵇ, each located in axial alignment with the respective valves and slidably mounted in stuffing boxes 27ª. This arrangement provides a balanced construction in which the oil pressure and the steam pressure is effective respectively upon the plungers 23ᵇ and 24ᵇ and counteracts the effect of such pressure upon the end faces of the valves 23 and 24, which being in the same direction as the tension exerted by the spring 34, might effect the automatic action of said valves and thereby unintentionally bring about an operation of the regulator out of harmony with its adjustment. With this balanced arrangement nothing affects the operation of the valves 23 and 24 other than the boiler pressure exerted upon the piston 28 and the action of the spring 34. Otherwise this form of construction may be the same and operate in the same way as first described.

The device is simple in construction and efficient in operation and may be utilized in any case where an admixture of media in predetermined proportions is desired to be delivered and maintained at a given point.

Various changes in the forms shown and described may be made within the scope of the claims without departing from the spirit of my invention.

I claim:

1. A regulator for regulating the admixture of media in predetermined proportions comprising a body having a plurality of passages therein through which the media pass, cylindrical members constituting valves and movable transversely across said passages to control the same and having their end faces shaped to co-operate in a predetermined manner with said passages, said valves being individually adjustable in axial directions and independently rotatable to change the relation of said end faces to said passages whereby the proportions of the media in the mixture are varied and means for operating said valves without disturbing said adjustment.

2. A regulator for regulating the admixture of media in predetermined proportions comprising a body having a plurality of passages therein through which the media pass, a yoke, cylindrical valves carried by said yoke and movable transversely across said passages to control the same and having their end faces inclined with respect to their axes, said valves being individually rotatable upon said yoke, to change the relation of said end faces to said passages whereby the proportions of the media in said mixture are varied, means for securing said valves in their adjusted positions on said yoke and means connected with said yoke whereby said valves are operated without disturbing said adjustment.

3. A regulator for regulating the admixture of media in predetermined proportions comprising a body having a plurality of passages therein through which the media pass, cylindrical members constituting valves and movable transversely across said passages to control the same and having their end faces shaped to co-operate in a predetermined manner with said passages, said valves being individually adjustable to change the relation of said end faces to said passages whereby the proportions of the media in the mixture are varied, means for operating said valves without disturbing said adjustment and plungers connected with said valves and acted upon by said media to balance said valves against any tendency of the media to shift the same.

4. A regulator for regulating the admixture of media in predetermined proportions comprising a body having a plurality of passages therein through which the media pass, cylindrical members constituting valves and movable transversely across said passages to control the same and having their end faces shaped to co-operate in a predetermined manner with said passages, said valves being individually adjustable in axial directions and independently rotatable to change the relation of said end faces to said passages whereby the proportions of the media in the mixture are varied, means for operating said valves in one direction without disturbing said adjustment, means for actuating said valves in the opposite direction without disturbing said adjustment and means whereby said valves are concurrently adjusted in the direction of their length and whereby the actuation thereof in said opposite direction is arrested.

5. A regulator of the kind described comprising a body provided with a fuel passage and with a passage for an atomizing agent, a yoke, cylindrical valves rotatably mounted upon said yoke and movable transversely across said passages to control the same, said valves having their end faces inclined with respect to their axes and being individually rotatable upon said yoke to change the relation of said end faces to said passages whereby the proportions of fuel and atomizing agent are varied, means for securing said valves in their adjustable positions on said yoke, a cylinder, a piston movable therein and connected with said yoke whereby said valves are concurrently operated in one direction without disturbing said adjustment, a spring engaging said yoke whereby said valves are concurrently operated in the opposite direction without disturbing said adjustment, a plug adjustably mounted on said body for adjusting the tension of said spring, a rod connected with said yoke and passing through said plug, and a hand wheel adjustably mounted on said rod whereby said valves are concurrently adjusted in the direction of their length relatively to said passages and whereby the operation of said valves by said spring is arrested.

In testimony whereof I have hereunto set my hand.

ERNEST GROSSENBACHER.